Figure 1:
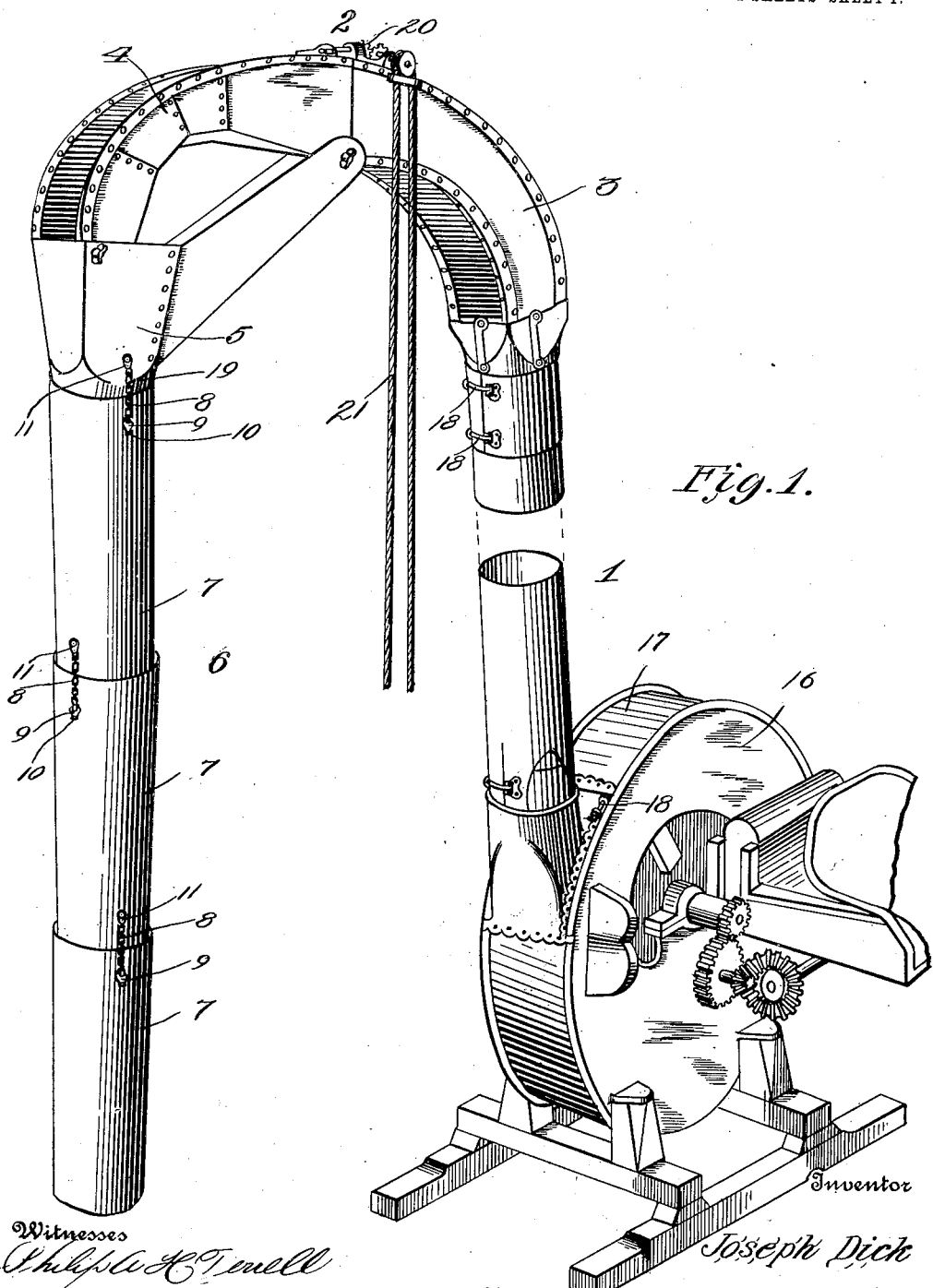

J. DICK.
DISCHARGE SPOUT.
APPLICATION FILED JUNE 29, 1912.
1,050,623.
Patented Jan. 14, 1913.
2 SHEETS—SHEET 2.
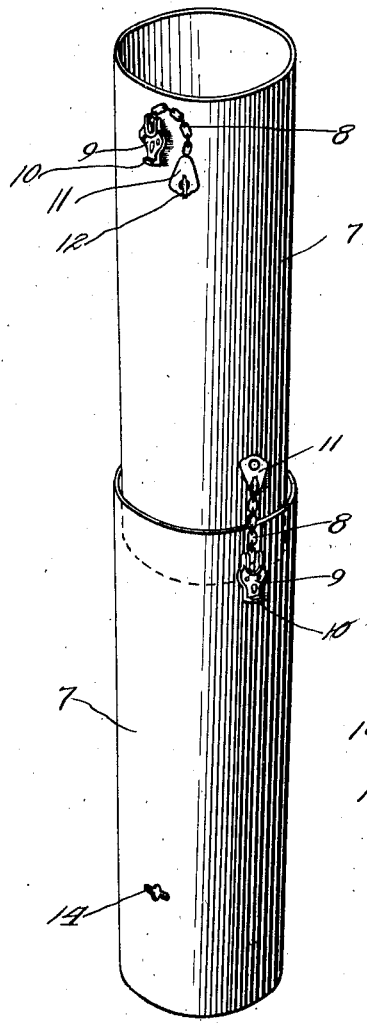
Fig. 2.
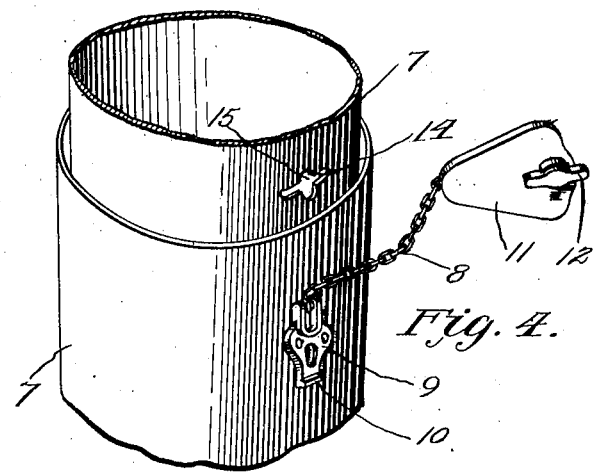
Fig. 4.
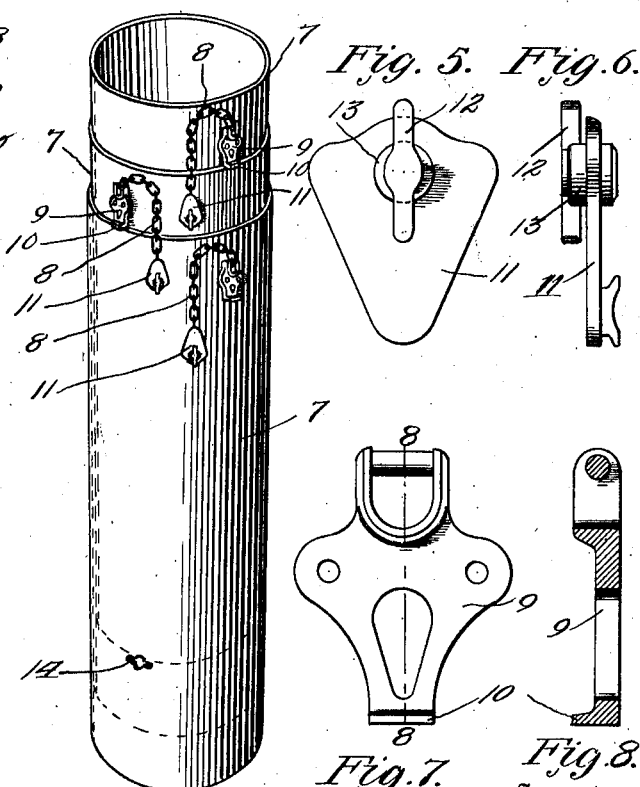
Fig. 5. Fig. 6.
Fig. 3.
Fig. 7. Fig. 8.
Inventor
Joseph Dick
Witnesses
Philip A. H. Terrell
Ruth A. Miller
By Harry Frease
Attorney

UNITED STATES PATENT OFFICE.

JOSEPH DICK, OF CANTON, OHIO.

DISCHARGE-SPOUT.

1,050,623. Specification of Letters Patent. Patented Jan. 14, 1913.

Original application filed May 3, 1912, Serial No. 694,861. Divided and this application filed June 29, 1912.
Serial No. 706,621.

*To all whom it may concern:*

Be it known that I, JOSEPH DICK, a citizen of the United States, residing at Canton, in the county of Stark and State of Ohio, have invented certain new and useful Improvements in Discharge-Spouts, the same being illustrated and described, but not claimed, in my application for Letters Patent for improvements in fodder-cutter discharge-pipes, filed May 3, 1912, Serial No. 694,861, and of which invention the following is a specification.

The invention relates to the discharge pipe leading from the blower of a fodder cutter or like machine for elevating the severed silage and discharging it into a silo, which discharge pipe, in the present instance, includes an elevating division, a deflecting division and a distributing division or discharge spout; and the object of the improvement is to provide a discharge spout composed of a series of slightly tapered pipe sections, with specially designed flexible and detachable connecting links, to permit a free flection and a ready detachment or telescoping of the several sections of the spout.

A preferred embodiment of the invention, thus set forth in general terms, is illustrated in the accompanying drawings, forming part hereof, in which—

Figure 1 is a perspective view of a fodder-cutter blower and its discharge pipe, showing the same in operative position; Fig. 2, a perspective view of two sections of the discharge spout linked together; Fig. 3, a perspective view of three sections of the discharge spout telescoped together; Fig. 4, a fragmentary perspective view showing the method of linking together the sections of the discharge spout; Fig. 5, an inner side view of the detachable link-plate; Fig. 6, an edge view of the same; Fig. 7, an outer side view of the fixed link-plate; and Fig. 8, a section of same on line 8—8, Fig. 7.

Similar numerals refer to similar parts throughout the drawings.

The discharge pipe is composed of the elevating division 1, the deflecting division 2 which includes the ascending section 3, the descending section 4 and the hopper 5; from which hopper is suspended the pendent distributing division or discharge spout 6 which includes the several pipe sections 7.

The several sections 7 of the discharge spout are composed of round sheet metal pipe, each section being preferably made about thirty inches longer and being tapered from a larger upper end to a smaller lower end and to such an extent that each section, excepting about four inches of the upper end, will freely telescope and nest within the adjoining section below. The pipe sections 7 are connected together by a pair of diametrically opposite flexible links 8, which, as shown, are preferably in the form of chains, for each joint, the connecting links of alternate joints being located in cross diameters, and the parts being so proportioned that the smaller end of each upper pipe will enter a short distance, say about three inches, into the larger end of the next lower section, whereby flexible joints are formed between the several sections and the lower end of the spout can be swung to discharge the silage in various directions. Each link is securely connected to the external surface of the larger end of the pipe, as by means of the link plate 9 which is permanently fastened, as by rivets, to the pipe, and is provided at its lower end with the projecting foot 10 which foot is located at such distance from the upper or larger end of the pipe-section to serve as a stop for the upper rim or edge of the next lower pipe-section to prevent a binding of the sections one upon another when they are telescoped together, as shown in Fig. 3.

The upper end of each flexible link 8 is detachably secured to the adjoining pipe section by means of the plate 11 having a button on its inner side composed of the longitudinal bar 12 and the enlarged central shank 13; which button, when the plate is turned crosswise, is adapted to be entered into the transverse slot 14 provided in the pipe section adjacent to the joint, which slot has the central enlargement 15 and corresponds in outline to the bar and shank of the button; after which, by turning the plate with its button to a vertical position, the parts are held securely together, but are obviously readily detached again by merely rotating the plate to a transverse position.

In the use of the discharge spout the fodder cutter 16 is located adjacent to the silo or other receiving receptacle, and the elevating division of the discharge pipe, preferably with the deflecting division secured and clamped to the upper end thereof, is placed upon the neck of the blower outlet, and at the same time the deflecting division of the discharge pipe is entered into the receiving opening of the silo; in which relation of the parts the inner or concave side or the lower end of the ascending section of the deflecting pipe is preferably abutted against the wall of the silo below the opening, which abutment may be accomplished by moving the fodder cutter as a whole or by rotating the annular rim 17 on the side plates thereof, which may be readily done by a temporary loosening of the rim clamping bolts 18. A sufficient number of sections to make a discharge spout of suitable length are then linked together, and the upper end of the upper section is telescoped around the neck 19 of the hopper 5 to which it is connected by flexible links 8 on opposite sides in the same manner in which the pipe sections are connected together. The adjusting mechanism 20 connected to the hinged joint of the deflecting division is then operated by the cable 21 to rotate the descending section 4 of the deflecting division so that the funnel of its hopper and the discharge spout sections secured thereto will depend directly downward, preferably near the middle of the silo.

In the operation of the discharge pipe it is evident that the lower end of the discharge spout thereof may be swung upon the hopper funnel as a center, to reach all parts of the silo, and furthermore that, as the silo is filled, the lower sections of the discharge spout are readily detached and removed by lifting the section upward sufficiently far to rotat the detachable link-plate to withdraw its button from the transverse slot of the adjacent pipe section. It is also evident that the several sections of the discharge spout can be telescoped or nested together for storage or transportation, as shown in Fig. 8, and that the stops 10 provided thereon will prevent a binding of the tapered parts together and thereby avoid any difficulty in disassembling them for further use.

The improvements in pneumatic conveyers illustrated and briefly described but not claimed herein, are made the subject-matter of claims in the said original application filed May 3, 1912, Serial No. 694,861, of which this application is a divisional part.

I claim:

1. A discharge spout composed of a series of tapered pipe sections, links for connecting together the several sections, the smaller ends of the pipe sections having slots therein, and each link being secured at one end to the outer side of the larger end of one of the pipe sections and having means on the other end for engaging in one of the slots in the smaller end of an adjoining section.

2. A discharge spout composed of a series of tapered pipe sections, flexible links for connecting together the several sections, the smaller ends of the pipe sections having laterally-elongated centrally-enlarged slots therein, and each link being secured at one end to the outer side of the larger end of one of the pipe sections and having a plate on the other end with an enlarged shank and a vertically-elongated button thereon for engaging in one of the slots in the smaller end of an adjoining section.

3. A discharge spout composed of a series of tapered pipe sections, links for connecting together the several sections, the smaller ends of the pipe sections having slots therein and each link being secured at one end to the outer side of the larger end of one of the pipe sections and having means on the other end for engaging in one of the slots in the smaller end of an adjoining section, and a stop on the outer side of the larger end of each pipe section for abutting the larger end of another adjoining section.

JOSEPH DICK.

Witnesses:
RUTH A. MILLER,
PHILIP A. H. TERRELL.